United States Patent
Kim

(10) Patent No.: US 10,416,948 B2
(45) Date of Patent: *Sep. 17, 2019

(54) HEAD MOUNT DISPLAY AND METHOD FOR CONTROLLING OUTPUT OF THE SAME

(71) Applicant: LG Electronics Inc., Seoul (KR)

(72) Inventor: Jihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 682 days.

This patent is subject to a terminal disclaimer.

(21) Appl. No.: 14/822,660

(22) Filed: Aug. 10, 2015

(65) Prior Publication Data

US 2015/0346492 A1 Dec. 3, 2015

Related U.S. Application Data

(63) Continuation of application No. 13/660,646, filed on Oct. 25, 2012, now Pat. No. 9,134,949.

(30) Foreign Application Priority Data

Sep. 10, 2012 (KR) ........................ 10-2012-0099776

(51) Int. Cl.
| | |
|---|---|
| *G06F 3/14* | (2006.01) |
| *H04N 5/232* | (2006.01) |
| *G06T 19/00* | (2011.01) |
| *G06F 3/01* | (2006.01) |
| *H04N 21/414* | (2011.01) |
| *H04N 21/43* | (2011.01) |
| *H04N 21/439* | (2011.01) |
| *H04N 21/45* | (2011.01) |
| *G02B 27/01* | (2006.01) |

(52) U.S. Cl.
CPC ......... *G06F 3/1423* (2013.01); *G02B 27/017* (2013.01); *G06F 3/017* (2013.01);
(Continued)

(58) Field of Classification Search
CPC ............... H04N 21/439; H04N 5/7491; H04N 21/41407; H04N 21/4307; H04N 21/4516;
(Continued)

(56) References Cited

U.S. PATENT DOCUMENTS 5,987,106 A * 11/1999 Kitamura ............ H04L 12/2803
  379/102.02
8,190,749 B1   5/2012 Chi et al.
(Continued)

FOREIGN PATENT DOCUMENTS

WO   WO 2012069183 A1 *  5/2012 ........... G06F 9/4445

*Primary Examiner* — Xiaolan Xu
(74) *Attorney, Agent, or Firm* — Birch, Stewart, Kolasch & Birch, LLP

(57) ABSTRACT

A head mount display and method for outputting an output of the same are discussed. The method includes outputting a first task from the head mount display, the first task including at least one of a first video output and a first audio output; recognizing a portable device, which outputs a second task including at least one of a second video output and a second audio output; determining whether the first and second video outputs are swapping targets, if the portable device is recognized; swapping the first video output with the second video output if the first and second video outputs are determined to be swapping targets; determining whether the first and second audio outputs are swapping targets, if the portable device is recognized; and swapping the first audio output with the second audio output if the first and second audio outputs are determined to be swapping targets.

16 Claims, 13 Drawing Sheets

(52) U.S. Cl.
CPC ....... *G06T 19/006* (2013.01); *H04N 5/23293* (2013.01); *H04N 21/41407* (2013.01); *H04N 21/4307* (2013.01); *H04N 21/439* (2013.01); *H04N 21/4516* (2013.01); *G02B 2027/014* (2013.01); *G02B 2027/0138* (2013.01); *G09G 2320/0613* (2013.01); *G09G 2358/00* (2013.01)

(58) Field of Classification Search
CPC .......... G02B 27/017; G02B 2027/0138; G02B 2027/014; G06F 3/1423; G09G 2358/00; G09G 2320/0613
See application file for complete search history.

(56) References Cited

U.S. PATENT DOCUMENTS

| | | | |
|---|---|---|---|
| 8,427,396 B1 | 4/2013 | Kim | |
| 8,558,759 B1* | 10/2013 | Prada Gomez | G06F 3/017 |
| | | | 345/156 |
| 2002/0094845 A1* | 7/2002 | Inasaka | H04M 1/05 |
| | | | 455/566 |
| 2005/0046823 A1* | 3/2005 | Ando | G01S 7/4811 |
| | | | 356/4.01 |
| 2006/0152594 A1* | 7/2006 | Landschaft | H04N 7/185 |
| | | | 348/211.99 |
| 2007/0085759 A1* | 4/2007 | Lee | G06F 1/1616 |
| | | | 345/1.1 |
| 2009/0052859 A1* | 2/2009 | Greenberger | G11B 31/003 |
| | | | 386/213 |
| 2012/0302289 A1 | 11/2012 | Kang | |
| 2012/0311608 A1* | 12/2012 | Park | G06F 3/0486 |
| | | | 718/107 |
| 2013/0070163 A1* | 3/2013 | Connors | H04N 21/47205 |
| | | | 348/734 |
| 2013/0235985 A1* | 9/2013 | Christoff | H04M 7/0069 |
| | | | 379/90.01 |
| 2013/0290882 A1* | 10/2013 | Cotte | G06F 9/4445 |
| | | | 715/764 |
| 2013/0342569 A1* | 12/2013 | Karkkainen | G02B 27/017 |
| | | | 345/633 |

* cited by examiner

| | TASK | VIDEO PRIORITY | AUDIO PRIORITY |
|---|---|---|---|
| 311 | CALL | MID | HIGH |
| 312 | E-BOOK | MID | LOW |
| 313 | MOVIE | LOW | LOW |
| 314 | MUSIC | LOW | LOW |
| 315 | PICTURE | HIGH | LOW |
| 316 | GAME | MID | LOW |
| 317 | NAVI | MID | MID |

FIG. 9
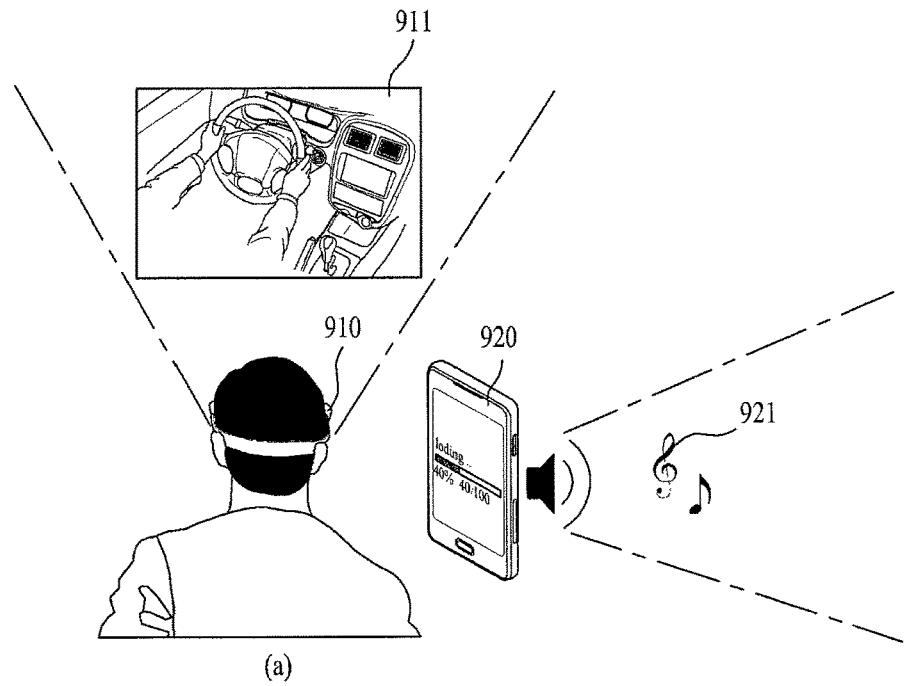
(a)
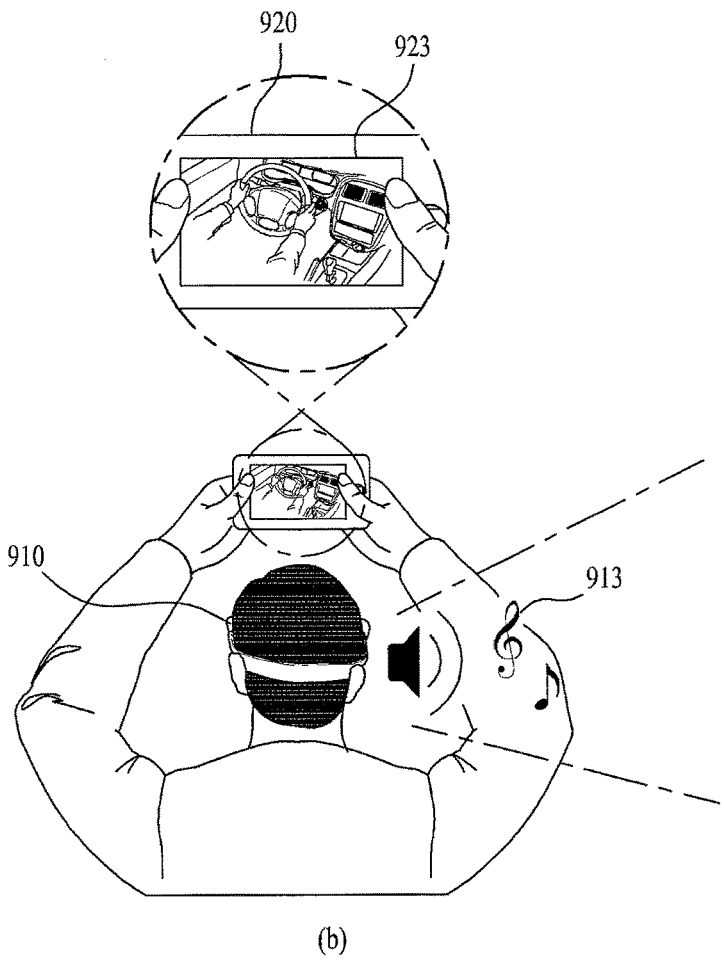
(b)

FIG. 11
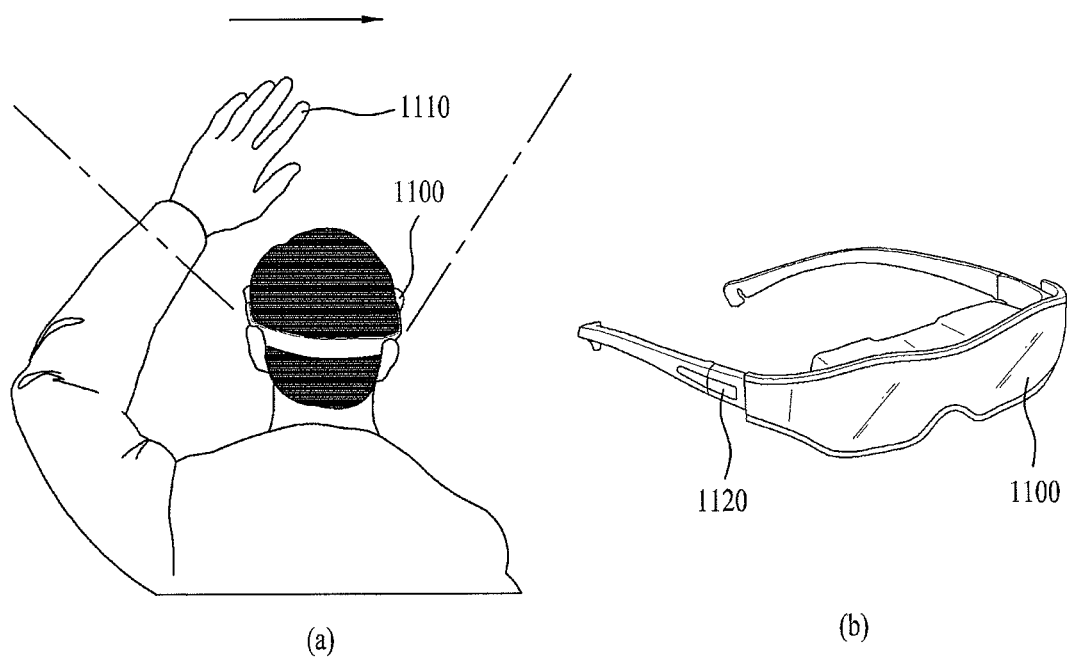
(a)        (b)
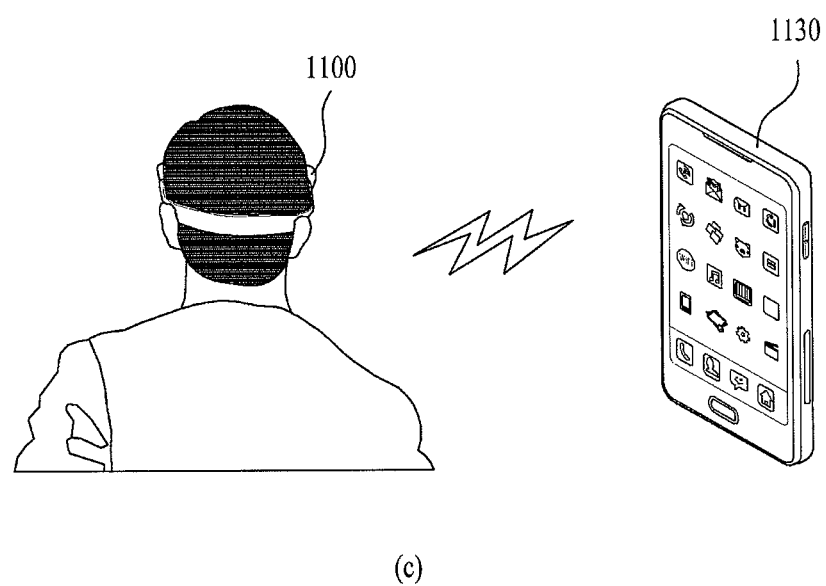
(c)

HEAD MOUNT DISPLAY AND METHOD FOR CONTROLLING OUTPUT OF THE SAME

CROSS-REFERENCE TO RELATED APPLICATIONS

This application is a Continuation of co-pending U.S. application Ser. No. 13/660,646, filed on Oct. 25, 2012, which claims the benefit of the Korean Patent Application No. 10-2012-0099776, filed on Sep. 10, 2012. The entire contents of all the above application are incorporated herein by reference.

BACKGROUND OF THE INVENTION

Field of the Invention

The present invention relates to a head mount display and a method for controlling an output of the same, and more particularly, to a method for controlling an output of a head mount display connected with a portable device through a network which swaps audio outputs or video outputs with the portable device.

Discussion of the Related Art

A head mount display (HMD) means various video display devices that allow a user to wear on his/her head like glasses and view videos. With the trend of lightweight and miniaturization of portable devices, various wearable computers have been developed, and the HMD has been widely used. The HMD may provide various conveniences to users in combination with the augmented reality technology and the N screen technology in addition to a simple display function.

In this respect, the HMD may be connected with a portable device near a user through a network and may output a task which is being performed by the corresponding portable device. The HMD may also receive a user input for the portable device or perform a task together with the corresponding portable device.

However, although the HMD protects a privacy of the user by allowing people near the user not to view or hear an output task, since the task output to the portable device may be seen or heard by people near the user, a problem occurs in that a privacy of the user is not protected.

Also, if a task for privacy protection is set to be output from the HMD, a problem in user convenience may occur in that the user feels inconvenience due to a small size of the HMD.

SUMMARY OF THE INVENTION

Accordingly, the present invention is directed to a head mount display and a method for controlling an output of the same, which substantially obviate one or more problems due to limitations and disadvantages of the related art.

An object of the present invention is to provide a head mount display that may segregate an audio output of a task from a video output of the task depending on user conditions to perform swapping with a portable device. That is, according to the present invention, the head mount display may separately swap an audio output or a video output with the portable device.

Another object of the present invention is to provide a head mount display that may perform swapping with a portable device automatically or manually for at least one of audio outputs and video outputs of a task.

Other object of the present invention is to provide a head mount display that is connected with a portable device through a network and performs a mutual task with the portable device by considering privacy protection of a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an output of a head mount display connected with a portable device through a network comprises the steps of outputting a first task from the head mount display, the first task including at least one of a first video output and a first audio output; recognizing the portable device, which outputs a second task including at least one of a second video output and a second audio output; determining whether the first video output and the second video output are swapping targets, if the portable device is recognized; swapping the first video output with the second video output if it is determined that the first video output and the second video output are swapping targets; determining whether the first audio output and the second audio output are swapping targets, if the portable device is recognized; and swapping the first audio output with the second audio output if it is determined that the first audio output and the second audio output are swapping targets.

In another aspect of the present invention, in a head mount display connected with a portable device through a network, the head mount display outputting a first task, which includes at least one of a first video output and a first audio output, and the portable device outputting a second task, which includes at least one of a second video output and a second audio output, the head mount display device comprises a sensor unit recognizing the portable device; a controller performing swapping by determining whether the first video output and the second video output are swapping targets, if the portable device is recognized and determining whether the first audio output and the second audio output are swapping targets; and a display unit outputting the first video or the second video in accordance with the determined result; and an audio output unit outputting the first audio or the second audio in accordance with the determined result.

According to one embodiment of the present invention, the HMD may perform swapping with the portable device by segregating the audio outputs of the task from the video outputs of the task. Accordingly, the user may select a convenient output means from the HMD and the portable device by segrefating the video outputs from the audio outputs depending on his/her conditions. That is, according to the present invention, the head mount display may separately swap an audio output or a video output with the portable device.

Also, according to another embodiment of the present invention, the HMD may perform swapping with the portable device automatically or manually for either the audio outputs or the video outputs of the task. In this way, since the user may select swapping, user convenience is improved.

According to other embodiment of the present invention, since the HMD may output the audio output or the video output of the portable device, which performs the task through mutual operation with the HMD, through swapping, privacy protection of the user may be maximized.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram illustrating an example of swapping video outputs and audio outputs between a head mount display and a portable device according to the present invention;

FIG. 11 is a diagram illustrating examples of receiving an input signal from a user in a head mount display according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

The embodiments of the present invention shown in the accompanying drawings and described by the drawings are only exemplary, and technical spirits of the present invention and its main operation are not limited by such embodiments.

Figure 1:
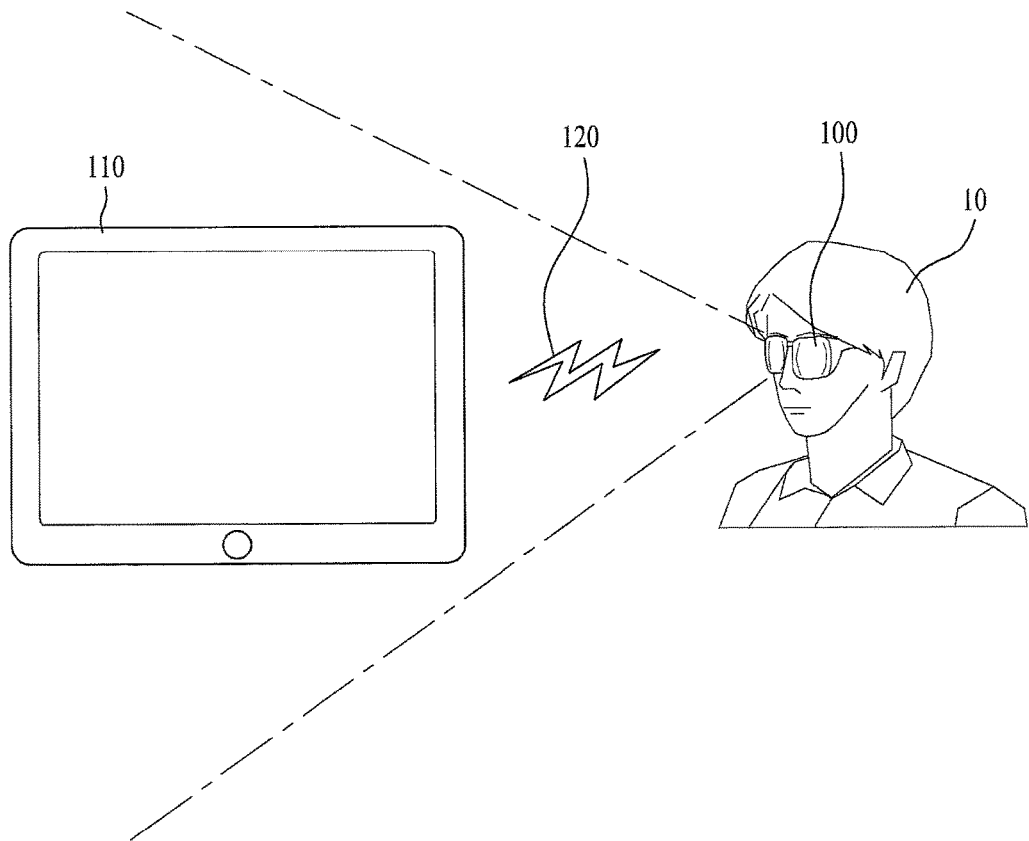
FIG. 1 is a diagram illustrating an example of a head mount display connected with a portable device through a network in accordance with the present invention.

FIG. 1 is a diagram illustrating an example of a head mount display connected with a portable device through a network in accordance with the present invention. A user 10 may wear a head mount display (hereinafter, referred to as 'HMD') 100 according to the present invention as shown in FIG. 1, and the HMD may be connected with a portable device 110 through a network 120 and may be operated together with the portable device 110.

The portable device 110 according to the present invention includes all of devices with which a user may carry, and its examples may include a cellular phone, a tablet PC, and a personal digital assistant (PDA). The portable device 110 may output various types of contents, which include at least one of live broadcasting, movie, music, drama, webpage, game and application.

Accordingly, the portable device 110 may include a display unit and an audio output unit, which output contents, and may include a communication unit for data transmission and reception to and from the HMD 100.

Also, pairing or communication connection may be performed separately for interaction between the HMD 100 and the portable device 110. This pairing or communication connection task may be performed by a user input through the HMD 100 or the portable device 110.

For example, the HMD 100 may provide a separate button or user interface for pairing or communication connection with the portable device. The user may perform pairing or communication connection between the HMD 100 and the portable device 110 through an input based on a button or user interface. Also, after pairing or communication connection is performed, the HMD 100 or the portable device 110 may be set to automatically perform pairing or communication connection in accordance with a previously set rule if it reaches a state available for pairing or communication connection.

In the meantime, according to the present invention, the network 120 may include various types of wire or wireless network 120 to enable communication between the HMD 100 and the portable device 110. At this time, the available wireless network 120 includes near field communication (NFC), Zigbee, infrared communication, Bluetooth, Wi-Fi, etc., and is not limited to a specific type network.

Communication between the HMD 100 and the portable device 110 according to the present invention may be performed using any one of the aforementioned networks 120, or combination among the aforementioned networks 120.

Also, the HMD 100 and the portable device 110 according to the present invention may output various types of tasks.

The task may include an operation that may be performed by the portable device 110, or a unit of the operation. Examples of the task may include an application that may be implemented by the HMD 100 or the portable device 110, a program for input and output, and an operation for performing a specific function. Also, the specific function may include all of the functions that may be performed by the HMD 100 or the portable device 110, such as navigation function, camera function, phone call transmission and reception function, text message transmission and reception function. However, the task includes at least one of the audio output and the video output.

Hereinafter, for convenience of description, the task output from the HMD 100 will be referred to as a first task, and the task output from the portable device 110 will be referred to as a second task. At this time, the first task includes at least one of the first video output and the first video output, and the second task includes the second video output and the second audio output.

Figures 2, 3:
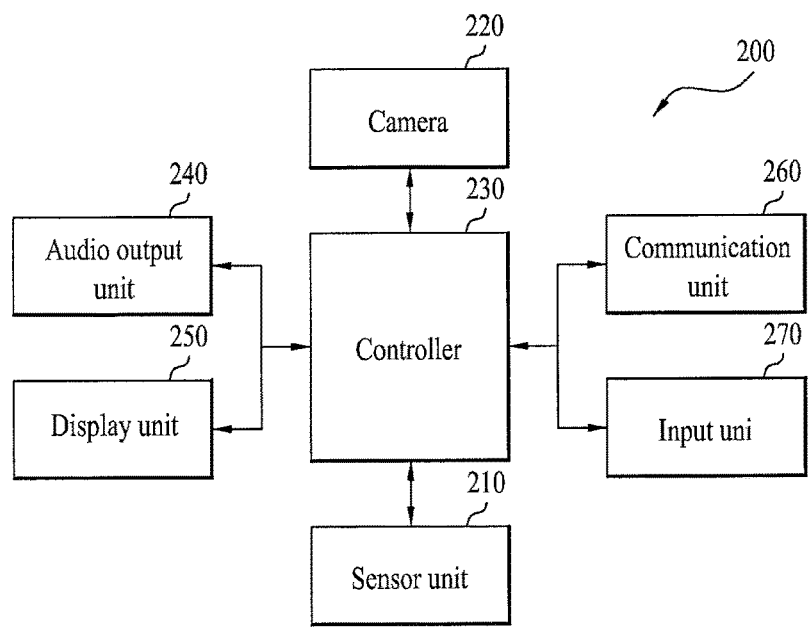
FIG. 2 is a functional block diagram illustrating a head mount display according to one embodiment of the present invention.
FIG. 3 is a diagram illustrating an example of priority of a video output and an audio output included in a task of a head mount display according to the present invention.

FIG. 2 is a functional block diagram illustrating a head mount display according to one embodiment of the present invention. However, FIG. 2 is one embodiment for description of the present invention, and some modules may be deleted or new modules may be added depending on the need of the person skilled in the art within the scope of the present invention.

As shown in FIG. 2, the HMD 200 of the present invention may include a sensor unit 210, a camera 220, a controller 230, an audio output unit 240, a display unit 250, a communication unit 260 and an input unit 270.

The sensor unit 210 forwards a user input or an environment recognized by the HMD 200 to the controller 230 by using a plurality of sensors provided in the HMD 200, and may include a plurality of sensing means.

The plurality of sensing means may include a sensing means such as a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, and a touch sensor.

In this way, the sensor unit 210 refers to the aforementioned various sensing means, and may sense various inputs of the user and the user's environment and forward the sensed result to the controller 230 to perform the operation based on the sensed result. The aforementioned sensors may be included in the HMD 200 as separate elements or may be incorporated into at least one or more elements.

Also, the sensor unit 210 may recognize the portable device. As an example of recognizing the portable device through the sensor unit 210, the sensor unit 210 may include an infrared sensor, and may recognize the portable device by sensing an infrared signal transmitted from the portable device.

Also, as another example of recognizing the portable device through the sensor unit 210, the sensor unit 210 may include an image pickup sensor that detects an image within a previously set view angle area of the HMD 200 and provides the detected image to the controller 230. The view angle area is a previously set area corresponding to sight of the user who wears the HMD 200, and may include an interval of a uniform angle range in a forward direction of the HMD 200.

The image pickup sensor may detect an image within a previously set view angle area through the camera 220 and provide the detected image to the controller 230, as the case may be. Accordingly, the camera 220 may be provided as a separate element, and may be included in the sensor unit 210 as an element of the image pickup sensor.

The controller 230 may analyze the image received through the sensor unit 210 or the camera 220 and detect whether the portable device is located in the view angle area. The controller 230 may identify whether the portable device corresponds to a previously set shape, if necessary.

In the meantime, the HMD 200 may recognize the portable device in various manners in addition to the method for recognizing the portable device through an infrared signal or the method for recognizing the portable device by detecting whether the portable device is located in the view angle area.

The controller 230 may implement contents received through data communication or contents stored in the MID 200. Also, the controller 230 may implement various applications and process data in the device. In addition, the controller 230 may control each unit of the HMD 200, and may control data transmission and reception between the respective units.

Also, if the portable device is recognized, the controller 230 may determine whether the first video output of the HMD 200 and the second video output of the portable device are swapping targets, and may control the HMD and the portable device to perform swapping. Also, the controller 230 determine whether the first audio output of the HMD 200 and the second audio output of the portable device are swapping targets, and may control the HMD and the portable device to perform swapping. This will be described in more detail with reference to FIG. 5 to FIG. 9.

The audio output unit 240 includes an audio output means such as a speaker and an ear phone. The audio output unit 240 may output audio on the basis of contents implemented by the controller 230 or a control command of the controller 230. In accordance with the result determined by the controller 230 as to whether the first audio output and the second audio output are swapping targets, the audio output unit 240 may output the first audio or the second audio.

The display unit 250 outputs images in a display screen. Accordingly, the display unit 250 may output images on the basis of contents implemented by the controller or a control command of the controller 230. Also, the display unit 250 may display images on the basis of a control command of the portable device linked with the HMD 200. At this time, the HMD 100 may receive data from the portable device through the communication unit 260, and may output images on the basis of the received data.

In accordance with the result determined by the controller 230 as to whether the first video output and the second video output are for swapping, the display unit 250 may output the first video or the second video.

The communication unit 260 may perform communication with the external device by using various protocols to transmit and receive data to and from the external device. At this time, the external device includes the portable device. Also, the communication unit 260 may access the network through the wire or wireless to transmit and receive digital data such as contents to and from the network. As a result, the communication unit 260 may transmit and receive video data or audio data to and from the network if necessary during the procedure of swapping the video output or the audio output.

In the meantime, according to one embodiment of the present invention, the communication unit 260 may include a plurality of antennas, and may detect the position state of the portable device connected with the HMD 200, by using a plurality of antennas. Accordingly, the HMD 200 may recognize the portable device through the communication unit 260. In other words, the communication unit 260 may detect whether the display unit of the portable device connected with the HMD 200 is located in the view angle area of the HMD 100, by using time difference, phase difference, etc. of signals transmitted and received respectively through the plurality of antennas provided in the HMD 200.

The input unit 270 may forward the user input to the controller 230 by using various input means provided in the HMD 200. At this time, the input means receives a touch input, motion input, audio input, etc. of the user, and its examples may include a touch pad and mike. The camera 220 may be used as the input means.

In addition, although not shown in FIG. 2, the HMD 200 may include a storage unit or a power unit.

The storage unit (not shown) may store various data such as video, audio, photos, moving pictures, and applications. The storage unit means various digital data storage area, such as a flash memory, a random access memory (RAM), and a solid state drive (SSD).

Also, the storage unit may temporarily store the data received from the portable device through the communication unit 260. At this time, the storage unit may be used for buffering for outputting the data or contents received from the portable device from the HMD 200. In the present invention, the storage unit may selectively be provided on the HMD 200.

The power unit is a power source connected with a battery in the device or an external power source, and may supply the power to the HMD 200.

The elements of the HMD 200 are shown in FIG. 2 by being logically identified from one another as blocks. Accordingly, the elements of the aforementioned device may be provided as one chip or a plurality of chips in accordance with design of the device.

In the meantime, if the portable device is recognized as described above, the HMD according to the present invention may swap the first video output with the second video output by determining whether the first video output and the second video output correspond to swapping targets. Also, if the portable device is recognized, the HMD may swap the first audio output with the second audio output by determining whether the first audio output and the second audio output correspond to swapping targets.

At this time, the order of determining swapping of the video outputs and determining swapping of the audio outputs in the HMD is not limited to a specific order, and may be determined simultaneously or in due order. In other words, swapping of the video outputs may first be determined, and swapping of the audio outputs may first be determined.

In determining whether the first video output and the second video output are swapping targets, a priority of the first video output is compared with that of the second video output. If the priority of the second video output is higher than that of the first video output, the first video output and the second video output may be determined as the swapping targets. In the present invention, the priority means a priority for outputting the video outputs or the audio outputs from the HMD not the portable device in swapping the video outputs or the audio outputs between the HMD and the portable device.

Also, in determining whether the first audio output and the second audio output are swapping targets, the HMD may compare the priority of the first audio output with that of the second audio output and determine the audio outputs as the swapping targets if the priority of the second audio output is higher than that of the first audio output.

FIG. 3 is a diagram illustrating an example of priority of a video output and an audio output included in a task of a head mount display according to the present invention. The priority of FIG. 3 has been set on the criteria of a privacy level of the user, and it is assumed that the higher the privacy level is, the higher the priority is. In this case, the privacy level is divided into a high level (HIGH), a middle level (MID), a low level (LOW), and has been set in such a manner that if the privacy level is towards from the high level to the low level, the priority is towards from the high level to the low level.

However, the video outputs exist but the audio outputs may not exist, or vice versa depending on attributes of the task. In such case, since it is difficult to compare the priorities, the HMD may compare the priorities by setting the priority of the video output or audio output, which does not exist, at the lowest level.

In FIG. 3, as examples of the task 310, a phone call receiving task 311, an E-book task 312, a movie contents task 313, a music play task 314, a picture task 315, a game task 316, and a navigation task 317 are shown.

First of all, in case of the call receiving task 311, since the video output for information on the other party exists, the priority order 320 of the video output may be set to the middle level (MID). However, since it is preferable that a phone call message is not output to other people, its privacy level is high. Accordingly, the HMD may set the priority 330 of the audio output to the high level (HIGH).

In case of the E-book task 312, since book contents are not related to the privacy of the user, the priority 320 of the video output may be set to the middle level (MID). Also, since the video outputs mainly exist in the E-book task 312, the priority 330 of the audio output may be set to the low level (LOW). However, if the audio output is performed, the priority 330 of the audio output may be readjusted.

Since the movie contents task 313 and the music play task 314 are not related to the privacy of the user, the priority 320 of the video output and the priority 330 of the audio output may be set to the low level (LOW). However, since the audio output does not exist in the picture task 315, the priority 330 of the audio output may be set to the lowest level (LOW). Also, since the video output needs to protect the privacy of the user, it may be set to the highest level (HIGH).

Also, in case of the game task 316, if a plurality of users perform a game, since a strategy of the game may be exposed, the priority 320 of the video output may be set to the middle level (MID), and the priority of the audio output may be set to the low level (LOW) as it is not related to the privacy of the user.

In the meantime, in case of the navigation task 317, since data on a path desired by the user are output, the priority 320 of the video output and the priority 330 of the audio output may be set to the middle level (MID).

The level of the priority shown in FIG. 3 is set on the criteria of the privacy level of the user, and the criteria for determining the priority is not limited to the criteria of the privacy level shown in FIG. 3. The level of the priority may be changed depending on the status or the set criteria. Also, the priority may be determined by other factors in addition to the privacy level of the user.

For example, the priority of the first video output and the second video output may be determined by the shape of the portable device recognized by the camera of the HMD. The shape of the portable device may be divided into a horizontal shape and a vertical shape. The video output of the task may be felt by the user conveniently or inconveniently depending on whether the portable device is a horizontal mode or a vertical mode. For example, the user may feel the horizontal mode more conveniently when viewing the video output for the picture or moving picture, but may feel the vertical mode, which displays more text messages, more conveniently when viewing the video output for text message history.

Accordingly, even in case of the video output of the same task, the priority may be varied depending on whether the shape recognized by the portable device is a horizontal shape or a vertical shape.

For example, it is assumed that the first video output displays a picture and the second video output displays a text message. If the shape of the portable device is not considered, since the first video output needs high resolution, the first video output and the second video output may be set for swapping. However, if the shape of the portable device is considered as the priority, the result may be varied.

In other words, if the shape of the portable device recognized by the HMD is a horizontal shape, the HMD may determine that the priority of the first video output is lower than that of the second video output, and may determine the first video output and the second video output as the swapping targets.

On the other hand, if the shape of the portable device recognized by the HMD is a vertical shape, the HMD may determine that the priority of the first video output is higher than that of the second video output, and may not determine the first video output and the second video output as the swapping targets.

Accordingly, in order that the priority of the first video output and the second video output is determined by the shape of the portable device, the suitable shape of the portable device should be set previously depending on the types of the video output. In this respect, the HMD according to the present invention may store the suitable shape of the portable device depending on the types of the video output in the aforementioned storage unit.

Also, the priority of the first video output and the second video output may be determined by the previously set criteria, which includes at least one of previously set attributes of the first task and the second task, implementation frequency of the first task and the second task, and recent implementation time of the first task and the second task, the need of the user input, resolution of the first video output and the second video output, and the previously set privacy level.

The user may feel viewing from the portable device more conveniently than viewing from the HMD depending on the types of the task. For example, if documents should be read by using a scroll like a document related task or the user input is required, the user may feel the portable device more conveniently than the HMD. On the other hand, in case of a banking related task, since the user may mind exposing banking details to external people, the user may feel the HMD more conveniently than the portable device.

Accordingly, the priority may previously be determined depending on attributes of the task or the need of the user input. At this time, the attributes of the task may include types of the task, the presence of the video output, and a history of a device from which the task is output.

Also, the HMD may set the priority of the video output at the low level so that the task having high implementation frequency or the recent task is output from the portable device, and vice versa.

Also, if the user watches contents such as movies or drama, the portable device may be used more suitably than the HMD in case of contents such as high resolution. Accordingly, if resolution of the video output is higher than the previously set resolution, the priority may be set at the low level, whereby the video output may be performed by the portable device. If resolution of the video output is lower than the previously set resolution, since it does not matter that the video output may be performed by the HMD, the priority may be set at the high level.

In the meantime, in determining whether the first audio output and the second audio output are swapping targets, the HMD may compare the priority of the first audio output with the priority of the second audio output. Then, if the priority of the second audio output is higher than that of the first audio output, the HMD may determine that the first audio output and the second audio output are swapping targets.

The priority of the audio output may include at least one of previously set attributes of the first task and the second task, the implementation frequency, the recent implementation time, and a previously set privacy level of the first audio output and the second audio output.

For example, if the task is the phone call receiving notification task, it is more preferable that the audio output may be performed by the portable device not the HMD. In case of the HMD, the phone call receiving notification task is notified most simply in the form of video output such as icon. This is because that the user may little interrupt the output of the existing task. Accordingly, in this case, the HMD may set the priority of the audio output at the low level.

On the other hand, if the task is the phone call receiving task, it is more preferable that the audio output may be performed by the HMD not the portable device. It is more preferable for privacy protection of the user that a phone call message of the user should be heard by the user only than that the phone call message is output to be open to other people. Accordingly, in this case, the HMD may set the priority of the audio output at the high level.

In this way, the priority may previously be determined depending on attributes of the task. At this time, the attributes of the task may include types of the task, the presence of the audio output, and a history of a device from which the task is output.

Also, the HMD may set the priority of the audio output at the low level so that the task having high implementation frequency or the recent task is output from the portable device, and vice versa.

If the HMD according to the present invention recognizes the portable device, it swaps at least one of the video output and the audio output. Hereinafter, the embodiments of the present invention will be described with reference to FIG. 4 to FIG. 13.

Figure 4:
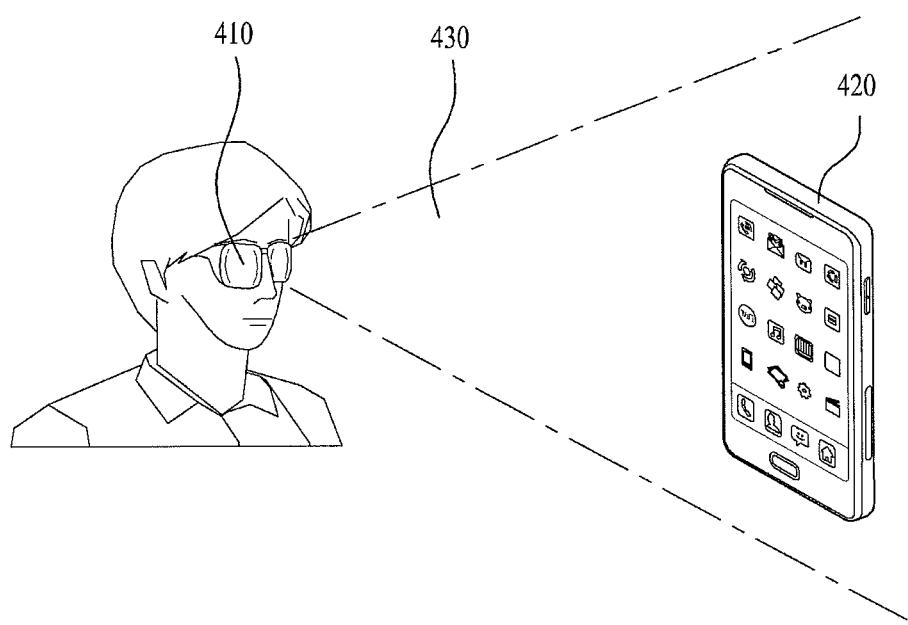
FIG. 4 is a diagram illustrating that a head mount display recognizes a portable device in accordance with the embodiment of the present invention.

First of all, FIG. 4 is a diagram illustrating that a head mount display recognizes a portable device in accordance with the embodiment of the present invention.

If the HMD 410 receives a signal outputting the second task from the portable device 420, it may turn a camera of the HMD 410 on. At this time, if the HMD 410 and the portable device 420 are paired, the HMD 410 may know whether the portable device 420 outputs the second task. Also, even if the HMD 410 and the portable device 420 are not paired, the portable device may transmit the output state by accessing the HMD 410 through the network when outputting the second task.

The HMD 410 which has turned on the camera may recognize the presence of the portable device 420 within an area 430 taken from the camera. At this time, the HMD 410 may detect the shape of the portable device 420 by extracting the image of the portable device 420 from the taken image.

Various methods may be used as described with reference to FIG. 2 as the method for recognizing the portable device in the HMD. However, as illustrated in FIG. 4, if the camera of the HMD 410 recognizes whether the portable device 420 is located at the front of the HMD 410, it is advantageous in that the video outputs are subjected to swapping and convenience is provided to the user. This is because that the user only changes his/her eyes without changing his/her pose or location.

Figure 5:
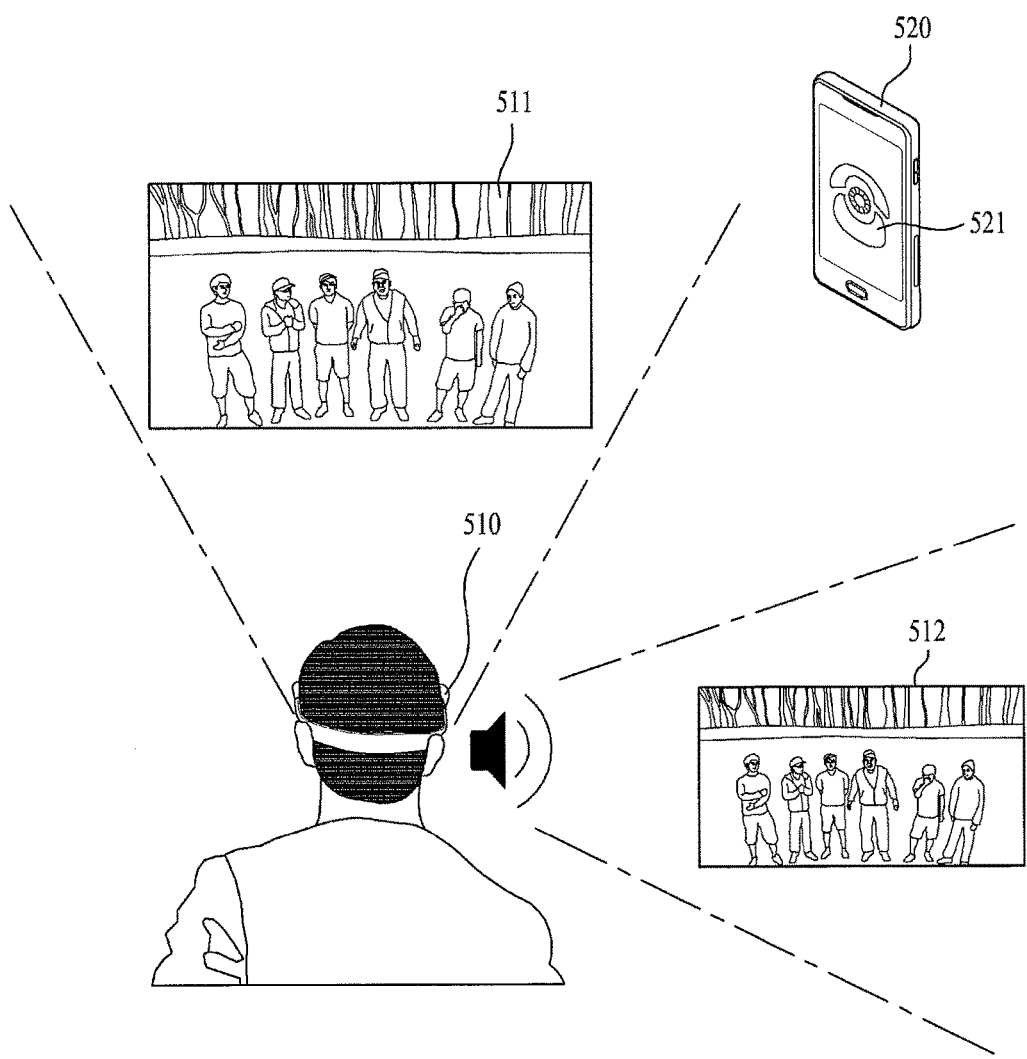
FIG. 5 is a diagram illustrating an example of a task output from a head mount display and a portable device according to the present invention.

FIG. 5 is a diagram illustrating an example of a task output from a head mount display and a portable device according to the present invention.

As shown in FIG. 5, it is assumed that the HMD 510 is outputting the first task for movie contents and the portable device 520 is outputting the second task for phone call reception. The first task may include a video output 511 for movie contents and an audio output 512 for movie contents, and the second task may include an audio output 521 only for phone call reception.

In case of FIG. 5, the user should receive a call of the portable device 520. If the user answers to the call by stopping play of a movie, there is inconvenience in that the user should watch a still screen while he/she is performing the call. However, if play of the movie is maintained, a problem occurs in that the user may not hear the other party's voice output from the portable device 520 due to the audio output of the HMD 510.

In this respect, the present invention is intended to solve the problem by swapping the video outputs only or swapping the audio outputs only.

Figure 6:
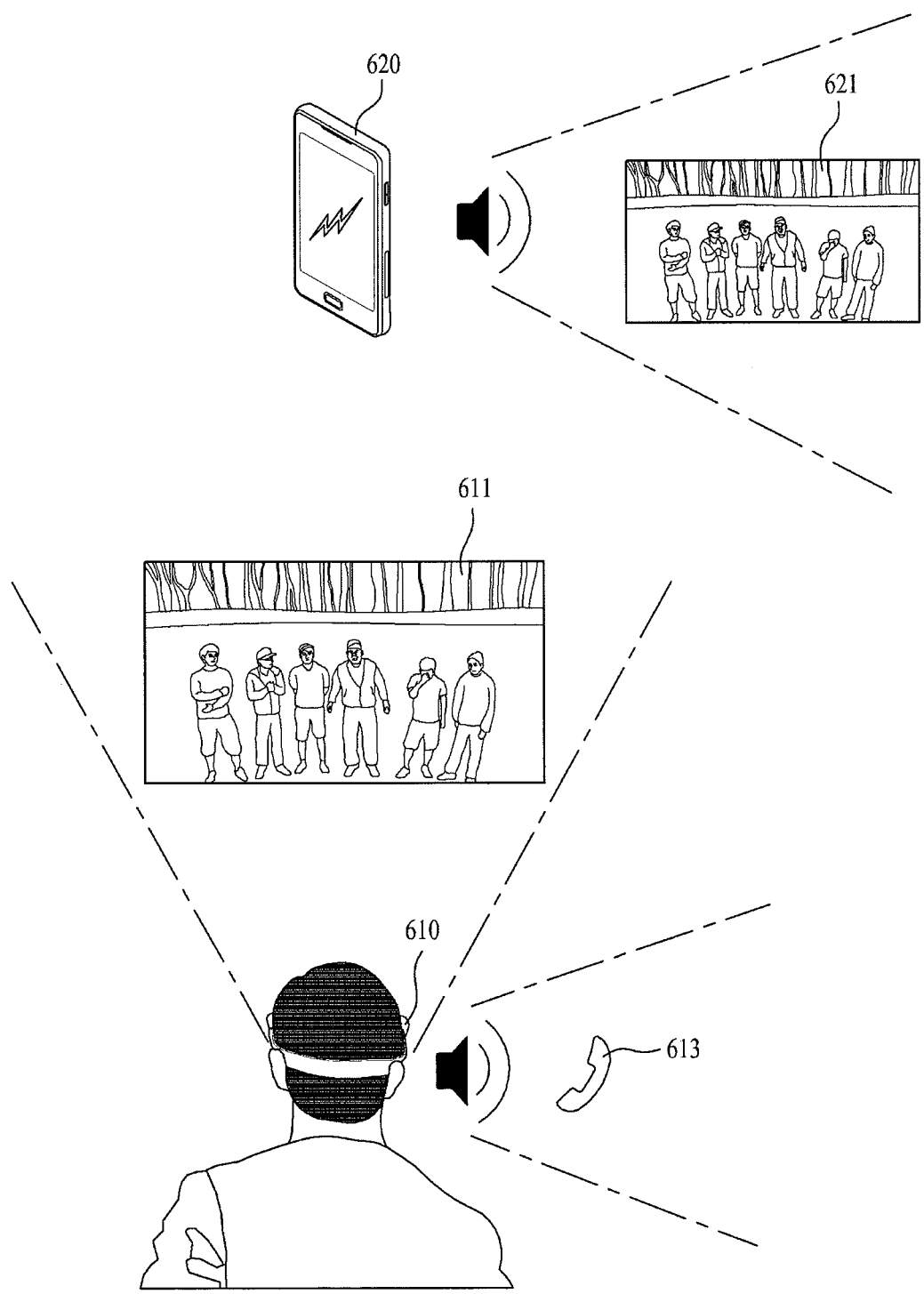
FIG. 6 is a diagram illustrating an example of swapping audio outputs between a head mount display and a portable device according to the present invention.

FIG. 6 is a diagram illustrating an example of swapping audio outputs between a head mount display and a portable device according to the present invention. FIG. 6 relates to a swapping result between the HMD and the portable device in respect of the task output from FIG. 5.

As described above, the HMD 610 may determine whether the video outputs or the audio outputs are swapping targets, in accordance with the previously set priority. In FIG. 6, it is assumed that the priority is determined on the criteria of the privacy level of the user. The higher the privacy level is, the higher the priority is. The video or audio having high priority is output from the HMD.

First of all, in case of the video output, since the second video output does not exist and thus has the lowest priority, the priority of the first video output becomes higher than that of the second video output. Accordingly, since swapping is not performed between the first video output and the second video output, the HMD 610 maintains the first video 611 as it is.

In case of the audio output, the first audio output has low priority due to its low privacy level, and the second audio output has high priority due to its high privacy level. Accordingly, swapping is performed between the first audio output and the second audio output, whereby the HMD 610 outputs the second audio 613, and the portable device 620 outputs the first audio 621.

Referring to FIG. 6, the user may watch a movie without stopping play of the movie while answering to the call, and may hear voice of the movie content output through the portable device 620. In other words, it is advantageous in that the user may feel that he/she performs the call while watching a TV. Also, the HMD according to the present invention is advantageous in that privacy of the user is protected as the user hears the other party's voice through the HMD 610.

Figure 7:
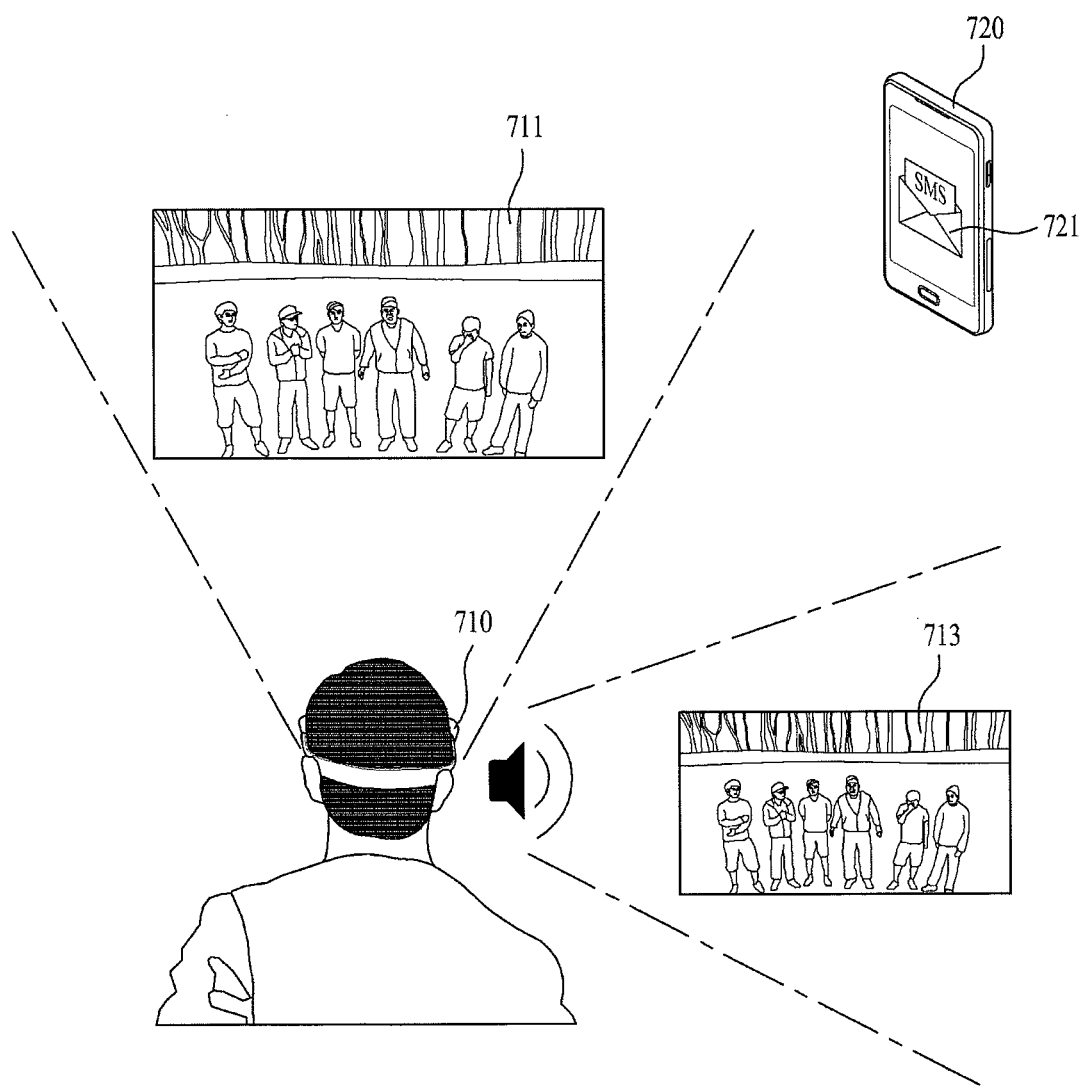
FIG. 7 is a diagram illustrating another example of a task output from a head mount display and a portable device according to the present invention.

FIG. 7 is a diagram illustrating another example of a task output from a head mount display and a portable device according to the present invention.

As shown in FIG. 7, it is assumed that the HMD 710 is outputting the first task for movie contents and the portable device 720 is outputting the second task for text message reception. The first task may include a video output 711 for movie contents and an audio output 713 for movie contents, and the second task may include a video output 721 only for text message reception.

In case of FIG. 7, the user should check a text message received by the portable device 720. If the user checks the text message by stopping play of a movie, it may interrupt concentration on the movie. On the other hand, if play of the movie is maintained, a problem occurs in that the user may not watch the video output from the HMD 710 due to the video output of the portable device 720.

In this respect, the present invention is intended to solve the problem by swapping the video outputs only or swapping the audio outputs only.

Figure 8:
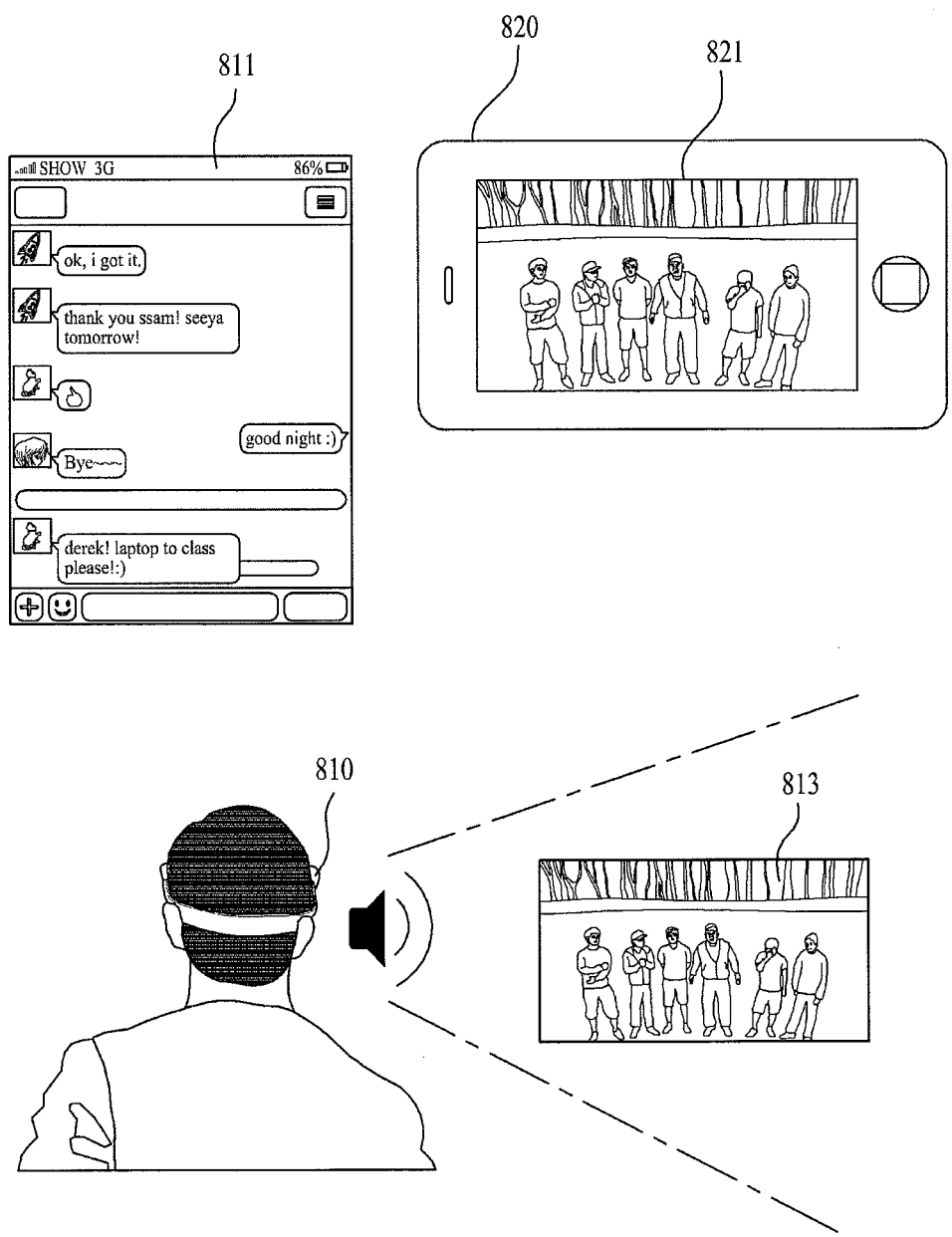
FIG. 8 is a diagram illustrating an example of swapping video outputs between a head mount display and a portable device according to the present invention.

FIG. 8 is a diagram illustrating an example of swapping video outputs between a head mount display and a portable device according to the present invention. FIG. 8 relates to a swapping result between the HMD and the portable device in respect of the task output from FIG. 7.

As described above, the HMD 810 may determine whether the video outputs or the audio outputs are swapping targets, in accordance with the previously set priority. In FIG. 8, it is assumed that the priority is determined on the criteria of the shape of the recognized portable device, and that a type of a task having high priority is previously set in accordance with the shape of the portable device. In FIG. 8, the shape of the portable device 820 recognized by the HMD 810 is a horizontal shape. Accordingly, in case of the video output suitable for the horizontal shape, the priority becomes low, and the video or audio having high priority is output from the HMD.

First of all, in case of the video output, the first task for movie contents is more suitable for the horizontal shape of the portable device than the second task for text message reception. Accordingly, the first video output has lower priority than the priority of the second video output. As a result, since swapping is performed between the first video output and the second video output, the HMD 810 outputs the second video 811.

In case of the audio output, the second audio output has the lowest priority as it does not exist. Accordingly, swapping is not performed between the first audio output and the second audio output, whereby the HMD 810 outputs the first audio 813.

Referring to FIG. 8, the user may hear audio of a movie content which is being played even while receiving a text message, and may watch a movie by using the portable device 820 if necessary. Accordingly, it is advantageous in that the user may continue to watch a movie content without interruption, and the HMD may protect privacy of the user by preventing the text message from being watched by other people.

FIG. 9 is a diagram illustrating an example of swapping video outputs and audio outputs between a head mount display and a portable device according to the present invention. FIG. 9 relates to a task where video outputs or audio outputs exist only. Also, in FIG. 9, it is assumed that the priority is determined by the previously set attribute.

For example, in case of the task related to video games, video outputs only may exist without audio outputs. At this time, since the priority of the video outputs needs high resolution, it is efficient that the video outputs are output from the portable device. Accordingly, the HMD may set the priority of the video outputs at the low level. Also, since the audio outputs do not exist, the priority of the audio outputs is set at the lowest level.

Also, in case of the task related to music play, audio outputs only may exist without video outputs. In this case, the user is most interested in listening to music without external noise. Accordingly, the HMD may set the priority of the audio outputs at the high level. Also, since the video outputs do not exist, the priority of the video outputs is set to the lowest level.

(a) of FIG. 9 illustrates that the first task is the video game related task, and the second task is the music play related task. Accordingly, if the HMD 910 according to the present invention recognizes the portable device 920, it determines whether the video output and audio output of the second task, which are being output from the portable device 920, are swapping targets with the video output and audio output of the first task, which are being output from the HMD 910.

First of all, since the priority of the first video output 911 is lower than that of the second video output, the HMD 910 determines that the video outputs are the swapping targets. Also, since the priority of the first audio output is lower than that of the second audio output, the HMD 910 determines that the audio outputs are the swapping targets.

Accordingly, as shown in (b) of FIG. 9, the HMD 910 outputs the second audio 913, and the portable device 920 outputs the first video 923. As a result, the user may listen to music without external noise, and may play a video game more vividly by using high resolution display of the portable device.

As illustrated in FIG. 9, the HMD according to the present invention may swap the video outputs and the audio outputs at the same time. Accordingly, the HMD according to the present invention may allow the device suitable for implementing the task to output video data or audio data, whereby convenience may be provided to the user.

Figure 10:
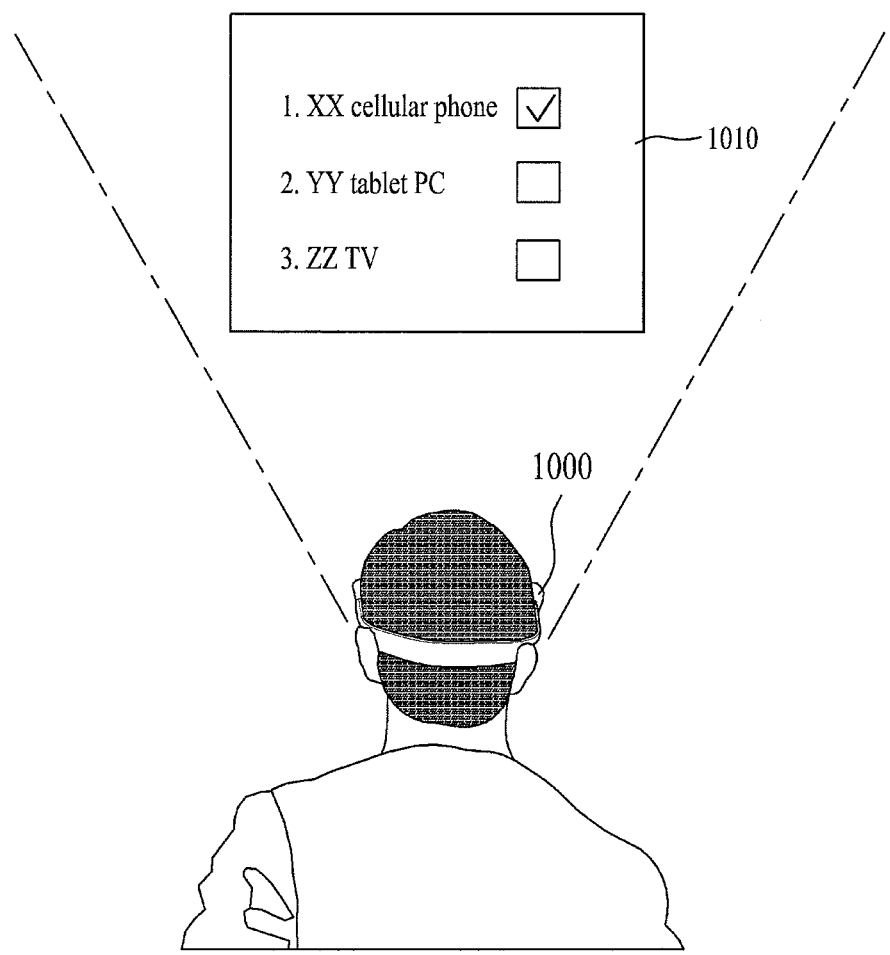
FIG. 10 is a diagram illustrating an example of a list of devices for swapping in a head mount display according to the present invention.

In the meantime, FIG. 10 is a diagram illustrating an example of a list of devices for swapping in a head mount display according to the present invention.

As described above, the HMD according to the present invention recognizes the portable device for swapping before swapping the video outputs or the audio outputs. At this time, if a plurality of portable devices are recognized, the HMD 1000 may display a list 101 of the recognized portable devices. Also, the HMD 1000 may receive a signal for selecting a specific one of the displayed portable devices from the user, and may select a random portable device as default. The selected specific portable device may separately be marked with a check like FIG. 10 to notify the user of the selected portable device.

The embodiment of FIG. 10 is especially suitable for the case where the HMD recognizes the portable device through the camera. In an environment where the portable device is widely used these days, one user may not use one device but own a plurality of portable devices such as a tablet PC and a cellular phone. Accordingly, since it is likely that a plurality of portable devices are recognized within an area taken from the HMD through the camera, a specific one of the plurality of portable devices may be selected as shown in FIG. 10 to avoid confusion.

In the meantime, it has been described that the HMD swaps the video outputs if it is determined that the first video output and the second video output are swapping targets and swaps the audio outputs if it is determined that the first audio output and the second audio output are swapping targets. In other words, it has been described that the HMD automatically performs swapping in accordance with the previously set priority. However, swapping may be performed in accordance with intention of the user.

Accordingly, in determining whether the first video output and the second video output are swapping targets, the HMD may determine that the first video output and the second video output are swapping targets, regardless of the priority if a signal requesting swapping is received from the user. Also, in determining whether the first audio output and the second audio output are swapping targets, the HMD may determine that the first audio output and the second audio output are swapping targets, regardless of the priority if a signal requesting swapping is received from the user.

At this time, the HMD may determine swapping targets even if any one of the video outputs or any one of the audio outputs does not exist.

For example, the case where the video output does not exist means that there are no video data to be output. Accordingly, if the first video output or the second video output does not exist when performing swapping, the HMD may regard it as the first video output or the second video output having no data to be output and perform swapping with the other video output (the second video output or the first video output).

The HMD may determine the audio outputs equally to the video outputs and perform swapping for the audio outputs. Accordingly, if the first audio output does not exist, the HMD may regard it as the first audio output having no data to be output and perform swapping with the second audio output. Likewise, if the second audio output does not exist, the HMD may regard it as the second audio output having no data to be output and perform swapping with the first audio output.

Also, the HMD may determine swapping targets in accordance with the previously set priority and perform swapping by receiving a confirmation signal from the user. Accordingly, even in case of the corresponding outputs determined as swapping targets, the HMD may not perform swapping if the signal confirming swapping is not input, and may perform swapping if the signal confirming swapping is input.

FIG. 11 is a diagram illustrating examples of receiving an input signal from a user in a head mount display according to the present invention. A signal requesting swapping from the user and a signal confirming swapping will be described with reference to FIG. 11.

The signal requesting or confirming swapping may include a motion signal of the user, which is previously set as shown in (a) of FIG. 11. The HMD 1100 may recognize motion by detecting a hand 1110 of the user and motion of the hand 1110 through a sensing unit based on a camera. Accordingly, if motion of the user whose left hand is moving horizontally is set as a swapping request signal for the video outputs, the HMD 1100 may perform swapping of the video outputs in response to the swapping request signal based on motion.

Also, the signal requesting or confirming swapping may include a touch signal for a touch pad 1120 provided in the HMD 11000 as shown in (b) of FIG. 11. For example, if the touch pad 1120 is touched as much as the previous set number of times, the HMD 1100 may recognize it as a swapping request signal for the audio outputs. As a result, a command for swapping may previously be set in accordance with the number of times of the touch signal and a motion pattern of the touch signal.

Also, the signal requesting or confirming swapping may include an input signal received from the portable device 1130 as shown in (c) of FIG. 11. The HMD may have limitation unlike the other device in receiving the input signal of the user or providing a user interface for receiving the user input, in view of its structure. Accordingly, the HMD may provide the user interface to the user through a wide display, wide touch pad, etc. of the portable device 1130, and may receive the user input signal. As a result, the HMD 1100 may receive the user input signal requesting or confirming swapping from the portable device 1130.

Also, the HMD according to the present invention may receive a voice signal of the user through a sensing means. Reception of the signal requesting swapping in the HMD according to the present invention is not limited to the embodiments of FIG. 11.

As described above, in addition to automatic sapping in accordance with the attributes of the task, the HMD according to the present invention may perform swapping in accordance with a request of the user, whereby freedom of the user may be increased in controlling the output of the HMD.

Figure 12:
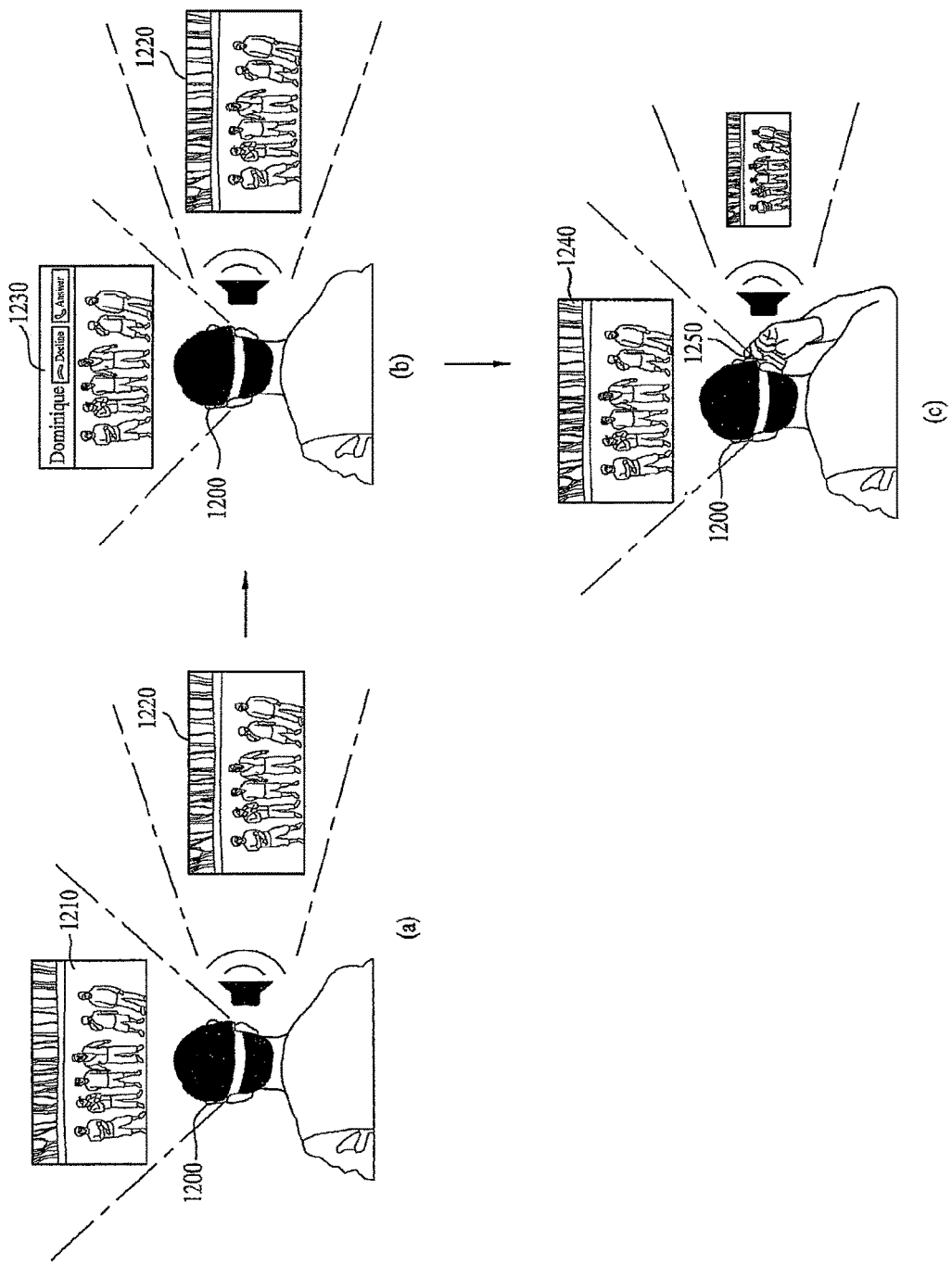
FIG. 12 is a diagram illustrating an example of receiving a swapping request signal from a user and performing swapping in a head mount display according to the present invention.

FIG. 12 is a diagram illustrating an example of receiving a swapping request signal from a user and performing swapping in a head mount display according to the present invention. In FIG. 12, it is assumed that a signal requesting swapping is a motion signal of the user, which is previously set.

As shown in (a) of FIG. 12, the HMD 1200 outputs the first task related to movie contents. The first task includes a first video output 1210 and a first audio output 1220.

At this time, if the portable device paired with the HMD 1200 outputs a task related to call reception, the HMD 1200 may recognized the task. As a result, as shown in (b) of FIG. 12, the portable device may display that the call receiving task is being output (1230).

At this time, if the HMD 1200 sets that swapping is selected manually by the user, the HMD 1200 detects a previously set motion by using a signal requesting swapping from the user and determines whether to perform swapping in accordance with the detected result. As shown in (c) of FIG. 12, if the user takes a motion putting the portable device 1250 to his/her ear, it may be regarded that the user will directly use the portable device 1250 without performing swapping. Accordingly, since the HMD 1200 has failed to detect the previously set motion, it does not perform swapping and maintains the output of the first task.

However, since the first audio output is repeated with the output of the portable device 1250, it may be difficult for the user to focus on a specific audio output. As a result, the HMD according to the present invention may set the volume of the first audio output to the low level and the volume of the second audio output to the high level. In FIG. 12, the volume of the audio output has been displayed by image size, and it is noted from FIG. 12 that image size corresponding to the first audio output of (c) of FIG. 12 is smaller than image sizes corresponding to the first audio outputs of (a) of FIG. 12 and (b) of FIG. 12.

In the meantime, as another example of setting the volume of the audio output, the HMD according to the present invention may not determine swapping for the audio outputs if it is determined that the video outputs are swapping targets, and the HMD or the portable device may output both the first audio output and the second audio output.

For example, if it is determined that the video outputs are swapping targets, and if the second audio output exists, the HMD may set the volume of the first audio output at the low level and the volume of the second audio output at the high level. And, the first audio output and the second audio output may be output from the HMD. This embodiment is especially useful for the status that it is difficult to output the audio from the portable device as the user is attending a meeting or is located at a public place.

In the meantime, the HMD according to the present invention may recognize the portable device in accordance with the previously set time interval, and may release the swapping state if the portable device is not recognized. This is because that swapping is performed on the assumption that the portable device is recognized.

For example, the HMD recognizes the portable device by detecting the shape of the portable device in the image taken from the camera. The HMD determines whether the portable device recognized in the image taken from the camera in accordance with a previously set unit exists. At this time, if the portable device does not exist, the HMD may release the swapping state. Also, the HMD may display information on swapping setting and information on swapping release to the user.

Figure 13:
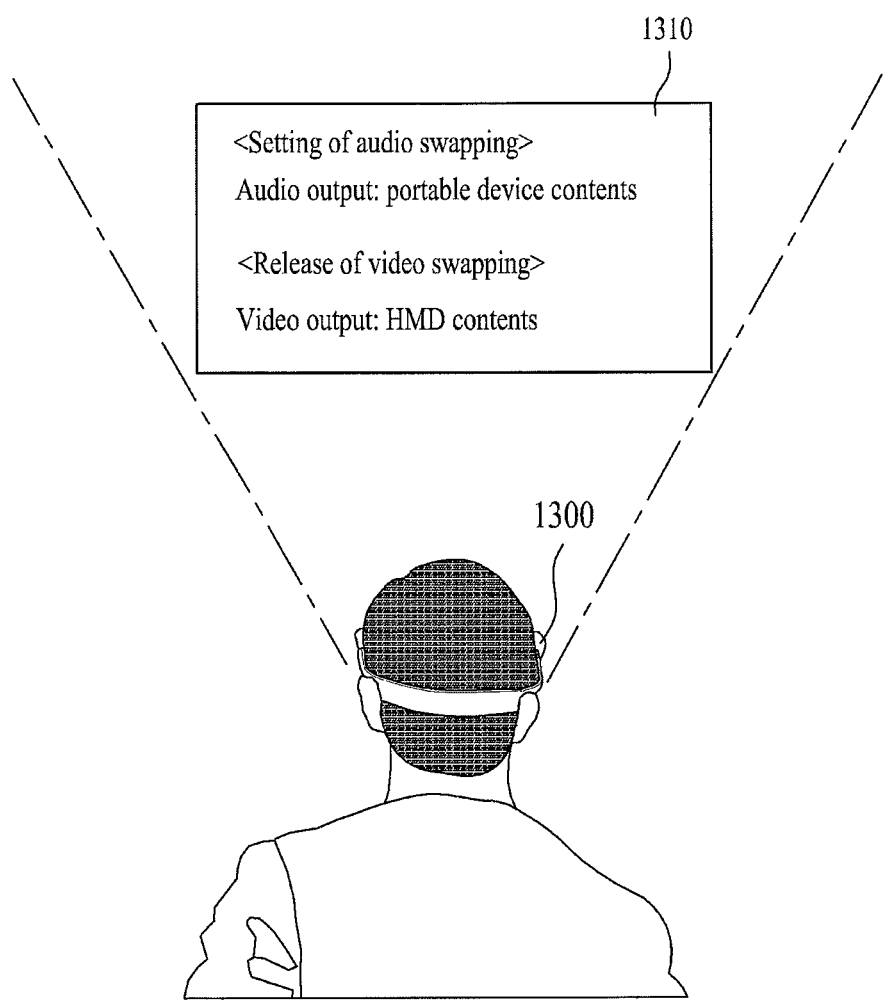
FIG. 13 is a diagram illustrating an example of displaying swapping information in a head mount display according to the present invention.

FIG. 13 is a diagram illustrating an example of displaying swapping information in a head mount display according to the present invention. As shown in FIG. 13, the HMD may display the swapping setting state or swapping release state for the video outputs and audio outputs. Accordingly, the user may reduce confusion due to swapping through the displayed information, and may easily determine whether to maintain the swapping state.

For example, if the output of the first task or the second task ends, since there are no swapping targets, the HMD may release the swapping state. However, even if one task ends, if the output at the swapping state is more convenient for the user, the user may desire to maintain the swapping state for the other task which is being output.

Accordingly, if the output of the first task or the second task ends, the HMD may display the end state. Also, the HMD may receive a signal determining whether to maintain the swapping state from the user and maintain or release the swapping state in accordance with the user's intention.

Figure 14:
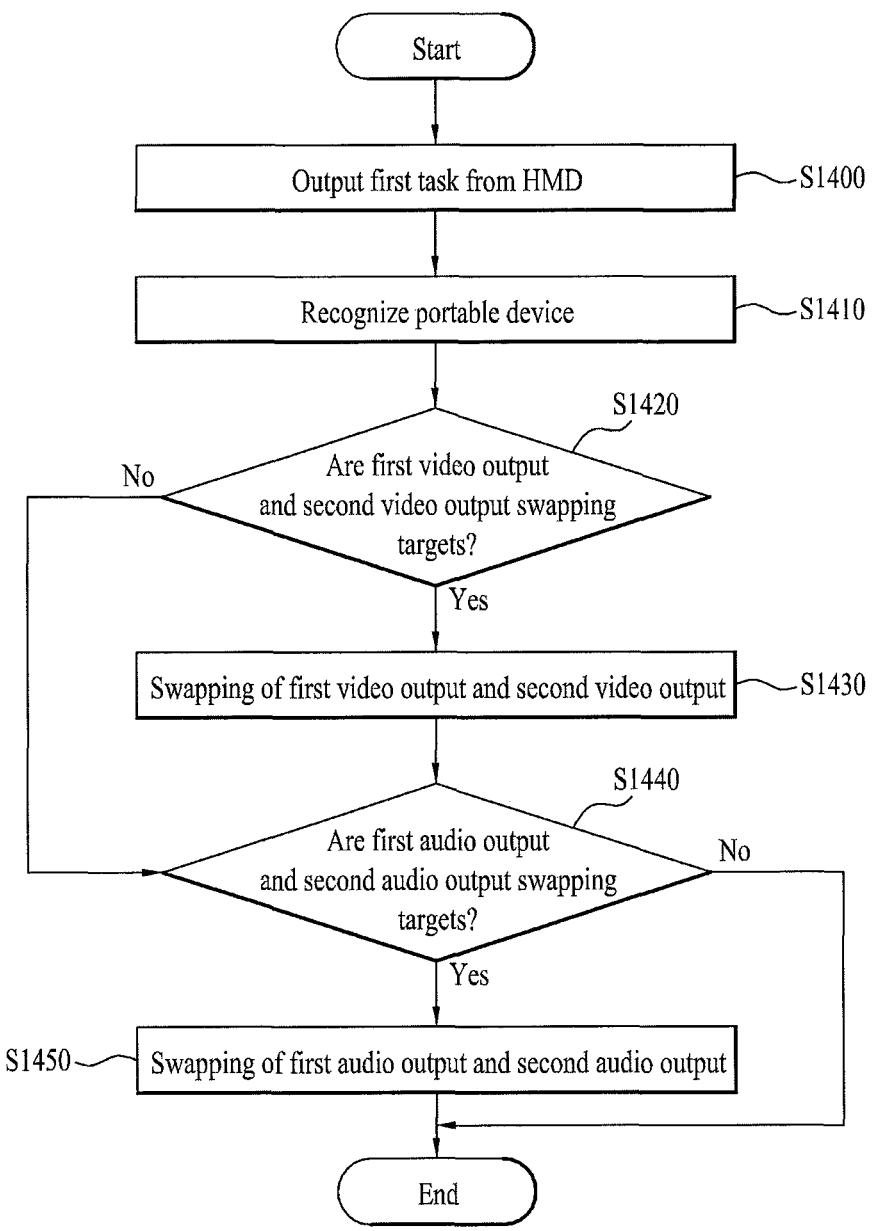
FIG. 14 is a flow chart illustrating a method for controlling an output of a head mount display according to one embodiment of the present invention.

FIG. 14 is a flow chart illustrating a method for controlling an output of a head mount display according to one embodiment of the present invention. One embodiment of a method for controlling the output of the HMD connected with the portable device through the network will be described with reference to FIG. 14.

First of all, the HMD according to one embodiment of the present invention outputs the first task (S1400). The first task means an operation that may be performed by the HMD and a unit of the operation. The first task includes at least one of the first video output and the first audio output.

The HMD recognizes the portable device (S1410). The portable device outputs the second task, and the second task includes at least one of the second video output and the second audio output.

As described with reference to FIG. 4, if the HMD receives the signal outputting the second task from the portable device, it turns its camera on and recognizes whether the portable device exists in the image taken from the camera.

At this time, as described with reference to FIG. 10, if a plurality of portable devices recognized through the camera are provided, the HMD may display a list of the recognized the portable devices. Accordingly, if the HMD receives a signal selecting a specific portable device, it may determine swapping for the specific portable device.

Next, the HMD determines whether the first video output and the second video output are swapping targets (S1420). To this end, as described with reference to FIG. 3, the HMD may compare the priority of the first video output with the priority of the second video output and determine that the first and second video outputs are swapping targets if the priority of the second video output is higher than that of the first video output.

The priority of the first video output and the second video output may be determined by the previously set criteria, which includes at least one of the shape of the portable device recognized by the HMD, previously set attributes of the first task and the second task, implementation frequency of the first task and the second task, and recent implementation time of the first task and the second task, the needs of the user input, resolution of the first video output and the second video output, and the previously set privacy level.

If it is determined that the video outputs are swapping targets, the HMD performs swapping (S1430), and determines whether the first audio output and the second audio output are swapping targets (S1440). In order that the HMD determines whether the audio outputs are swapping targets, as described with reference to FIG. 3, the HMD may compare the priority of the first audio output with the priority of the second audio output and determine that the first and second audio outputs are swapping targets if the priority of the second audio output is higher than that of the first audio output. If it is determined that the audio outputs are swapping targets, the HMD performs swapping (S1450).

At this time, the HMD may set the priority for the output which does not exist, among the first video output, the second video output, the first audio output and the second audio output, at the lowest level.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present invention.

The HMD and method for controlling the output of the same according to the present invention are limited to the aforementioned embodiments, and all or some of the aforementioned embodiments may selectively be configured in combination so that various modifications may be made in the aforementioned embodiments.

In the meantime, the method for controlling the output of the HMD according to the present invention may be implemented in a recording medium, which can be read by a processor provided in the network device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

What is claimed is:

1. A method for controlling an output of a head mount display (HMD) connected with a portable device through a network, the method comprising:
   outputting, via a display unit, a first task including at least one of a first video data and a first audio data;
   recognizing, via a sensor unit, the portable device which outputs a second task including at least one of a second video data and a second audio data; and
   swapping, via a controller, the first task with the second task and outputting the second task at the HMD,
   wherein information on a display mode of the portable device is received via the network,
   wherein the first video data is swapped with the second video data in response to the received information indicating the display mode of the portable device is a horizontal mode, and
   wherein the first video data is not swapped with the second video data in response to the received information indicating the display mode of the portable device is a vertical mode.

2. The method of claim 1, wherein the output of the first task is maintained until a signal requesting swapping is received, and
   wherein the signal requesting swapping includes at least one of a previously set motion signal of a user and a touch signal for the HMD.

3. The method of claim 2, wherein the output of the first task is maintained by setting a volume of the first audio data to a low level and a volume of the second audio data to a high level.

4. The method of claim 2, further comprising:
   receiving the motion signal; and
   maintaining the output of the first task if the motion signal is not the previously set motion signal.

5. The method of claim 2, wherein the previously set motion signal corresponds to a motion of putting the portable device to an ear of the user.

6. The method of claim 1, wherein the recognizing the portable device includes turning a camera of the HMD on if a signal outputting the second task is received from the portable device, and recognizing whether the portable device exists in an image taken from the camera.

7. The method of claim 6, wherein the recognizing the portable device includes displaying a list of a plurality of portable devices if the plurality of portable devices are recognized through the camera, and receiving a signal selecting a specific one of the displayed portable devices.

8. The method of claim 6, further comprising:
   determining whether the recognized portable devices exist in the image taken from the camera in accordance with a previously set time interval; and
   releasing a swapping state if the portable devices do not exist.

9. The method of claim 1, wherein the portable device is recognized based on at least one of a shape of the portable device detected through the camera and/or communication with the portable device.

10. The method of claim 1, further comprising:
displaying swapping information when a swapping target exists; and
receiving a signal confirming swapping from the user.

11. The method of claim 1, further comprising releasing a swapping state when an output of the first task or the second task ends.

12. The method of claim 1, further comprising:
displaying an end state when an output of the first task or the second task ends; and
receiving a signal determining whether to maintain a swapping state from a user.

13. A head mount display (HMD) connected with a portable device through a network, comprising:
a display unit configured to output a first task including at least one of a first video data and a first audio data;
a sensor unit; and
a controller configured to:
control the sensor unit to recognize the portable device which outputs a second task including at least one of a second video data and a second audio data, and
swap the first task with the second task and output the second task at the display unit, wherein information on a display mode of the portable device is received via the network,
wherein the first video data is swapped with the second video data in response to the received information indicating the display mode of the portable device is a horizontal mode, and
wherein the first video data is not swapped with the second video data in response to the received information indicating the display mode of the portable device is a vertical mode.

14. The HMD according to claim 13, wherein the controller is further configured to maintain the output of the first task through the display unit until a signal requesting swapping is received, and
wherein the signal requesting swapping includes at least one of a previously set motion signal of a user and a touch signal for the HMD.

15. The HMD according to claim 14, wherein the controller is further configured to maintain the output of the first task by setting a volume of the first audio data to a low level and a volume of the second audio data to a high level.

16. The HMD according to claim 14, wherein the controller is further configured to:
receive the motion signal, and
maintain the output of the first task if the motion signal is not the previously set motion signal.

\* \* \* \* \*